(12) United States Patent
Gottbehüt et al.

(10) Patent No.: US 12,134,410 B2
(45) Date of Patent: Nov. 5, 2024

(54) METHOD FOR CHECKING A SURROUNDINGS DETECTION SENSOR OF A VEHICLE AND METHOD FOR OPERATING A VEHICLE

(71) Applicant: DAIMLER AG, Stuttgart (DE)

(72) Inventors: Thomas Gottbehüt, Weil der Stadt (DE); Rihab Laarousi, Sindelfingen (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 337 days.

(21) Appl. No.: 17/600,655

(22) PCT Filed: Mar. 18, 2020

(86) PCT No.: PCT/EP2020/057486
§ 371 (c)(1),
(2) Date: Oct. 1, 2021

(87) PCT Pub. No.: WO2020/200792
PCT Pub. Date: Oct. 8, 2020

(65) Prior Publication Data
US 2022/0177005 A1 Jun. 9, 2022

(30) Foreign Application Priority Data
Apr. 4, 2019 (DE) ...................... 10 2019 002 487.7

(51) Int. Cl.
*B60W 60/00* (2020.01)
*G06V 20/58* (2022.01)

(52) U.S. Cl.
CPC .... *B60W 60/0053* (2020.02); *B60W 60/0059* (2020.02); *G06V 20/58* (2022.01);
(Continued)

(58) Field of Classification Search
CPC ......... B60W 60/0053; B60W 60/0059; B60W 2420/42; B60W 2554/4049; G06V 20/58;
(Continued)

(56) References Cited

U.S. PATENT DOCUMENTS 8,359,288 B1 * 1/2013 Kahn ................. G01C 21/3461
707/800
9,719,801 B1 * 8/2017 Ferguson ................ G01S 17/87
(Continued)

FOREIGN PATENT DOCUMENTS

CN 105857091 A 8/2016
CN 109387207 A 2/2019
(Continued)

OTHER PUBLICATIONS

International Search Report mailed Aug. 5, 2020 in related/corresponding International Application No. PCT/EP2020/057486.
(Continued)

*Primary Examiner* — Steven B Theriault
(74) *Attorney, Agent, or Firm* — PATENT PORTFOLIO BUILDERS PLLC

(57) ABSTRACT

A method for checking at least one surroundings detection sensor of a vehicle involves localizing the vehicle on a digital map and identifying features of stored stationary objects of the surroundings of the vehicle in the digital map, of which it is expected that they are recognized by the surroundings detection sensor. The surroundings of the vehicle are detected by the surroundings detection sensor and it is concluded that there has been a degradation of the surroundings detection sensor when the features to be recognized according to expectations are not recognized by the surroundings detection sensor or when features actually detected by the surroundings detection sensor deviate greatly from the features to be recognized according to
(Continued)

Figure 1:
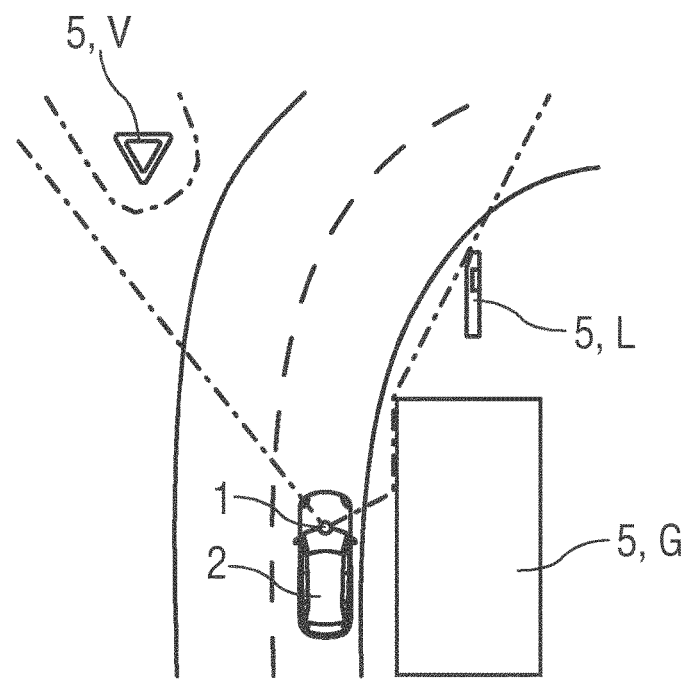

expectation. The digital map with the stored features of the stationary objects is retrieved for a predetermined projection horizon of a central storage unit external to the vehicle.

7 Claims, 2 Drawing Sheets

(52) U.S. Cl.
CPC .............. *B60W 2420/403* (2013.01); *B60W 2554/4049* (2020.02)

(58) Field of Classification Search
CPC ...... G01S 7/4091; G01S 7/4004; G01S 7/412; G01S 7/415; G01S 7/497; G01S 17/931; G01S 2013/9323; G01S 13/931
See application file for complete search history.

(56) References Cited

U.S. PATENT DOCUMENTS

| | | | | |
|---|---|---|---|---|
| 9,996,976 | B2* | 6/2018 | Zhou | G06T 7/344 |
| 11,555,903 | B1* | 1/2023 | Kroeger | G05D 1/024 |
| 2004/0189448 | A1 | 9/2004 | Eggers et al. | |
| 2014/0025292 | A1 | 1/2014 | Staehlin et al. | |
| 2015/0293216 | A1* | 10/2015 | O'Dea | B60W 30/02 |
| | | | | 701/23 |
| 2015/0317535 | A1* | 11/2015 | Lenor | G01N 21/538 |
| | | | | 382/104 |
| 2016/0163133 | A1* | 6/2016 | Ricci | G06F 21/32 |
| | | | | 701/33.4 |
| 2016/0189444 | A1* | 6/2016 | Madhok | G07C 5/02 |
| | | | | 701/36 |
| 2017/0023659 | A1* | 1/2017 | Bruemmer | G01S 5/0278 |
| 2017/0341575 | A1* | 11/2017 | Hauler | G09F 13/16 |
| 2018/0045519 | A1* | 2/2018 | Ghadiok | G06F 16/2379 |
| 2018/0059228 | A1* | 3/2018 | Raina | G01S 7/4911 |
| 2018/0172454 | A1 | 6/2018 | Ghadiok et al. | |
| 2018/0232947 | A1* | 8/2018 | Nehmadi | G01S 7/295 |
| 2018/0330171 | A1* | 11/2018 | Corcoran | G06V 20/58 |
| 2018/0330175 | A1* | 11/2018 | Corcoran | G06V 10/147 |
| 2019/0049968 | A1* | 2/2019 | Dean | G06T 7/292 |
| 2019/0061775 | A1* | 2/2019 | Emura | G01S 7/497 |
| 2019/0122386 | A1* | 4/2019 | Wheeler | G01C 21/1652 |
| 2020/0003897 | A1* | 1/2020 | Shroff | G01S 17/931 |
| 2020/0209853 | A1* | 7/2020 | Leach | G01S 7/4972 |
| 2021/0019537 | A1* | 1/2021 | Hiroi | G01W 1/02 |
| 2021/0201464 | A1* | 7/2021 | Tariq | G06V 10/811 |
| 2022/0177005 | A1* | 6/2022 | Gottbehüt et al. | G01S 7/412 |

FOREIGN PATENT DOCUMENTS

| | | | |
|---|---|---|---|
| DE | 10313002 | B4 | 3/2006 |
| DE | 102012023498 | A1 | 6/2014 |
| DE | 102013206707 | A1 | 10/2014 |
| DE | 102015010542 | A1 | 2/2016 |
| DE | 102014226020 | A1 | 6/2016 |
| DE | 102015206605 | A1 | 10/2016 |
| DE | 102017000753 | A1 | 7/2017 |
| DE | 102017003741 | A1 * | 10/2018 |
| DE | 102018006503 | A1 * | 1/2019 |
| DE | 102017214531 | A1 | 2/2019 |
| DE | 102018119235 | A1 | 2/2019 |
| DE | 102018127059 | A1 | 4/2020 |
| EP | 1909066 | A1 | 4/2008 |
| EP | 2540596 | A2 | 1/2013 |

OTHER PUBLICATIONS

Office Action created Jan. 16, 2020 in related/corresponding DE Application No. 10 2019 002 487.7.
Written Opinion mailed Aug. 5, 2020 in related/corresponding International Application No. PCT/EP2020/057486.
Office Action created Jan. 27, 2024 in related/corresponding CN Application No. 202080025095.6.

* cited by examiner

METHOD FOR CHECKING A SURROUNDINGS DETECTION SENSOR OF A VEHICLE AND METHOD FOR OPERATING A VEHICLE

BACKGROUND AND SUMMARY

Exemplary embodiments of the invention relate to a method for checking a surroundings detection sensor of a vehicle, as well as to a method for operating a vehicle.

DE 103 13 002 B4 discloses a vehicle surroundings detection unit in which surroundings information is detected by means of an image sensor. The detected surroundings information is processed by means of a computing unit to form image information and is depicted on a video image display. In addition, the image information is stored on an intermediary memory. A lastly detected image is compared to the image information stored on the intermediary memory by means of an image processing algorithm. In the event of an unreliable deviation of the lastly detected image from the saved image information, the video image displayed is depicted differently. Vehicle operating parameters are supplied to the vehicle surroundings detection unit in order to conclude on an unreliable deviation by a deviation of the image information to be expected because of the operating parameters between the points in time of capturing the lastly detected image and the saved image information cannot plausibly correlate to the result of a comparison of the image information.

Furthermore, DE 10 2013 206 707 A1 discloses a method for checking a surroundings detection system of a vehicle, the surroundings detection system comprises two different surroundings sensor types. A field of vision of a first surroundings sensor type does not overlap with a field of vision of a second surroundings sensor type. Objects in the surroundings of the vehicle are detected by the first surroundings sensor type and categorized into static and dynamic objects using the data of the first surroundings sensor type. A relative position of the detected static objects in relation to the vehicle is determined. This position is compared to a position ascertained using the second surroundings sensor type. In the event of a deviation beyond a threshold value, it is concluded that an error has occurred. The relative position of the detected static objects is updated after leaving the field of vision of the first surroundings sensor type by taking the movement of the vehicle into consideration.

DE 10 2018 127 059.3 describes a method for checking a surroundings detection sensor of a vehicle, wherein the vehicle is localized on a digital map and features of stored stationary objects of the surroundings of the vehicle are identified on the digital map, about which objects it is expected that they are recognized by the surroundings detection sensor. The surroundings of the vehicle are detected by the surroundings detection sensor, wherein it is concluded that there has been a degradation of the surroundings detection sensor when the features to be recognized according to expectations are not recognized by the surroundings detection sensor or when features actually recognized by the surroundings detection sensor deviate greatly from the features to be recognized according to expectations.

Exemplary embodiments of the invention are directed to an improved method in comparison to the prior art for checking a surroundings sensor of a vehicle and a novel method for operating a vehicle.

In a method for checking at least one surroundings sensor of a vehicle, the vehicle is localized on a digital map and features of stored stationary objects of the surroundings of the vehicle are identified on the digital map, about which objects it is expected that they are detected by the surroundings detection sensor. Furthermore, the surroundings of the vehicle are detected by the surroundings detection sensor and it is concluded that there has been a degradation of the surroundings detection sensor when the features to be recognized according to expectations are not recognized by the surroundings detection sensor or when features actually recognized by the surroundings detection sensor deviate greatly from a central storage unit external to the vehicle.

According to the invention, the digital map with the stored features of the stationary objects is accessed for a predetermined projection horizon of a central storage unit external to the vehicle.

Saving the features on the central storage unit external to the vehicle, for example a server, in particular a so-called backend server, makes it possible for data provision on storage units to be able to be minimized. In doing so, on the one hand, a size of free storage capacity in the vehicle can be reduced and, on the other hand, it can be simply ensured that the features used in the vehicle are always up to date. Resulting from this, the method always enables a reliable check of the at least one surroundings detection sensor, wherein, as a result of an availability and foresight of measuring results of a measurement to be expected by means of the surroundings detection sensor, it can be recognized in the vehicle in good time as to whether the surroundings detection sensor is in a proper state and whether a system operation based on a detection of the surroundings detection sensor, such as automated driving of the vehicle, for example, is possible and can be carried out safely or is limited.

In a possible design of the method, it is provided that, when the at least one surroundings detection sensor recognizes features, the features to be recognized according to expectations are compared with these features actually recognized by the surroundings detection sensor. When the features to be recognized according to expectations are consistent with these features actually recognized by the surroundings detection sensor or at least there is no too great deviation between the features to be recognized according to expectations and the features actually recognized by the surroundings detection sensor, it is concluded that there has been no degradation of the surrounding detection sensor. However, when the surroundings detection sensor does not recognize any features or when the features actually recognized by the surroundings detection sensor in this comparison are not consistent with the features to be recognized according to expectations and there is a great, in particular too great a, deviation, it is concluded that there has been degradation of the surroundings detection sensor. A great deviation, in particular too great a deviation, is present, in particular, when the deviation exceeds a predetermined tolerance region. That is to say when the features actually recognized by the surroundings detection sensor are not consistent with the features to be recognized according to expectations, the deviation between the features actually recognized by the surroundings detection sensor and the features to be recognized according to expectation is, however, not too great, in particular lies within the predetermined tolerance range, no degradation of the surroundings detection sensor is recognized.

In a further possible design of the method, landmarks, road signs, traffic equipment, for example for delimiting the carriageway, such as reflector posts, for example, and/or other suitable objects are used as stationary objects. Such objects are particularly suitable for use in the method due to their features.

In a further possible design of the method, a reflectivity of the stationary objects at a predetermined distance apart from the surroundings detection sensor, a reflector cross-section of the stationary objects and/or a texture of the stationary objects are evaluated as features of the stationary objects depending on the kind of surroundings detection sensor. Such features allow a particularly exact monitoring and checking of the at least one surroundings detection sensor and can be compared particularly simply and reliably.

In a further possible design of the method, the digital map is continuously updated on the central storage unit external to the vehicle. Thus, constantly up-to-date features are available to the vehicle for checking the at least one surroundings detection sensor.

In a further possible design of the method, updating is carried out by means of features of stationary objects detected by means of a plurality of vehicles and transferred to the storage unit. This results in a large and reliable database, wherein "outliers" can be easily recognized and taken into consideration. Thus, in a further possible design of the method, it is possible to ascertain how high a degree of reliability there is using the plurality of transferred features.

In a further possible design of the method, the digital map is updated when the transferred features deviate from the features stored on the digital map and a degree of reliability exceeds a predetermined value. Thus, a particularly effective update is achieved, wherein unnecessary updates with irrelevant features are avoided.

In a further possible design of the method, the features are transmitted to the central storage unit together with sensor-specific additional data of the corresponding surroundings detection sensor and stored on the central storage unit together with the corresponding features. Thus, in a particular advantageous manner, a sensor-specific application of the features for checking the surroundings detection sensor in question is possible, which makes possible a very accurate checking of the surroundings detection sensor.

In the method according to the invention for operating a vehicle, which is designed for an automated driving operation, in particular a highly automated or autonomous driving operation, at least one surroundings detection sensor of the vehicle is checked in a method described above for checking a surroundings detection sensor and, in the presence of a degradation of the surroundings detection sensor, a degree of automation of the driving operation is reduced or a driving task is transferred to a driver.

For availability and safety during automated driving, an efficiency of the at least one surroundings detection sensor, in particular in terms of a visibility range, accuracy and error rate, can be ensured in order to ensure a reliable automated driving operation of the vehicle. However, a de-calibrated surroundings detection sensor, for example a camera, a radar sensor, a Lidar sensor, etc., or a surroundings detection sensor limited in terms of its visibility, for example due to fog or dirt in the region of the optical path, does not fulfil these requirements of efficiency, which results in a reduced availability of a vehicle function and/or an unsafe system state with a great danger of accidents. A constant check of the at least one surroundings detection sensor is possible by means of the method, such that a limited efficiency thereof is reliably recognized and can be adjusted depending on the efficiency of the degree of automation of the automated driving operation or the driving task can be completely transferred to the driver. Thus, a safe driving operation of the vehicle can always be achieved. This means, by means of the method, potentially dangerous situations, for example no detection or detection too late of dynamic objects and stationary objects, in the surroundings of the vehicle as a result of unrecognized breaches of the efficiency of the surroundings detection sensor when detecting the surroundings are avoided. This means, by means of the method, an event of an error due to a degradation of one or more surroundings detection sensors of the vehicle can be recognized, and supporting system reactions can subsequently be introduced, for example from a slower journey to an emergency stop.

In a further possible design of the method, in the event of erroneous takeover of the driving task by the driver, the vehicle is brought to a standstill within a predetermined period of time. This increases the safety of the vehicle, occupants located inside it and other traffic participants.

In a further possible design of the method, in the event of erroneous takeover of the driving task by the driver, the vehicle is initially guided to an edge of the driving track or a hard shoulder within a predetermined period of time and then brought to a standstill. In doing so, along with the safety of the vehicle, the safety of occupants located inside it and other traffic participants is further increased, since a collision possibility with other traffic participants is reduced.

Exemplary embodiments of the invention are explained in more detail below by means of the drawings.

BRIEF DESCRIPTION OF THE DRAWING FIGURES

Figure 2:
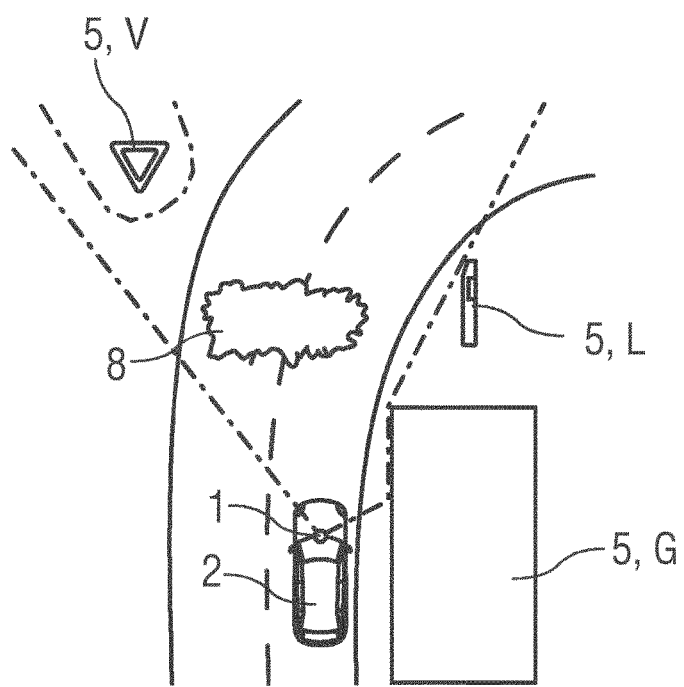
Figure 3:
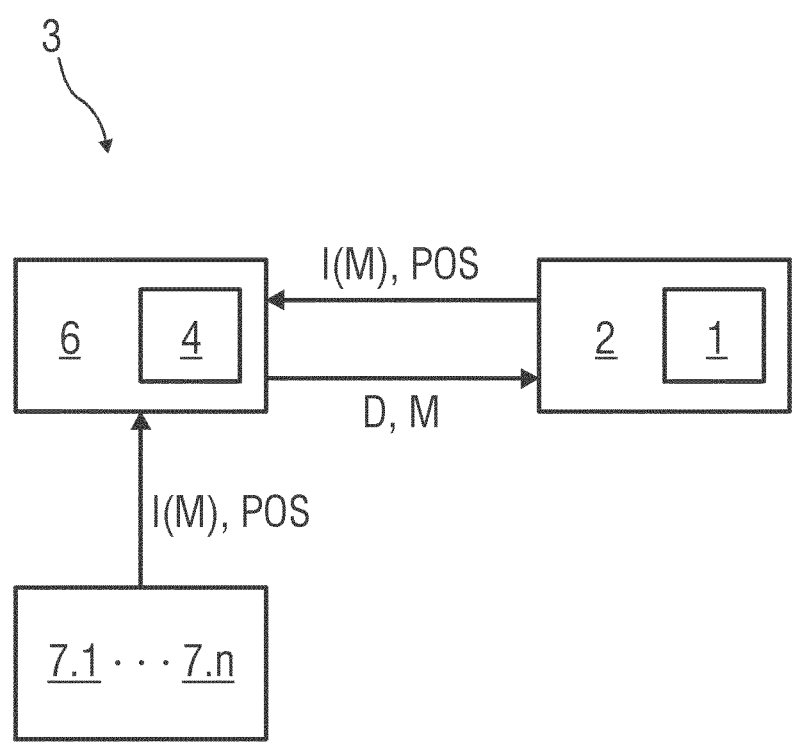

Here are shown:

FIG. 1, schematically, an example of a surroundings detection by means of a surroundings detection sensor of a vehicle, FIG. 2, schematically, a further example of a surroundings detection by means of a surroundings detection sensor of a vehicle, and FIG. 3, schematically, a block wiring diagram of a device for operating a vehicle.

Parts corresponding to one another are provided with the same reference numerals in all figures.

DETAILED DESCRIPTION

Below, a method for checking the at least one surroundings detection sensor 1 of the vehicle 2 and a method for operating the vehicle 2 are described by means of FIGS. 1 and 2, which show a surroundings detection by means of a surroundings detection sensor 1 of a vehicle 2, by way of example, and by means of FIG. 3, which shows a block wiring diagram of a possible exemplary embodiment of a device 3 for operating a vehicle 2. Here, the vehicle 2 is configured for an automated driving operation, in particular a highly automated or autonomous driving operation.

In the method for checking the surroundings detection sensor 1, the vehicle 2 is localized on a digital map 4, in particular by a position POS of the vehicle 2 being ascertained and a corresponding position on the digital map 4 being ascertained. Features M of stationary objects 5 stored on the digital map 4 of the surroundings of the vehicle 2 are identified on the digital map 4, about which objects it is expected that they are recognized by the surroundings detection sensor 1 when this operates without error.

The digital map 4 is, in particular, a so-called HD map and is used for the automated driving operation of the vehicle 2.

It represents the surroundings of the vehicle 2 with a pre-determinable and at least virtually arbitrary visible range and includes necessary subsequent information required for automated driving. The digital map 4 is stored on a central storage unit 6 external to the vehicle, in particular a server or backend server. Map data D present on the digital map 4 is provided to the vehicle 2 and, optionally, further vehicles 7.1 to 7.$n$ in real time.

Information I of the vehicles 2, 7.1 to 7.$n$ is used, inter alia, to update the digital map 4, the vehicles providing this per upload of the storage unit 6. In doing so, a so-called "map learning" is carried out, wherein, by aggregating the information I, statements

- relating to amended traffic routing,
- relating to correct driving behavior, for example driving in a driving lane,
- relating to target trajectories, for example driving is carried out with right-hand offset and/or a rescue lane is formed, and
- relating to the topology of the surroundings, for example a number of driving lanes, are derived.

Along with an upload of so-called HD map attributes with an absolute position for the "map learning", so-called OEM-specific data (OEM=Original Equipment Manufacturer), such as system states of a driver assistance system of a vehicle 2, can also be localized for a certain position on the digital map 4 and stored on the digital map 4. This also referred to as "OEM specific overlay" in the digital map 4.

The surroundings of the vehicle 2 are detected by the surroundings detection sensor 1. It is concluded that there has been a degradation of the surroundings detection sensor 1 when features M to be recognized according to expectations are not recognized by the surroundings detection sensor 1 or when features M actually recognized by the surroundings detection sensor 1 significantly deviate from the features M to be recognized according to expectations.

This means that, when the surroundings detection sensor 1 recognizes features M, the features M to be recognized according to expectations are compared to these features M actually recognized by the surroundings detection sensor 1. When the features M to be recognized according to expectations are consistent with these features M actually detected by the surroundings detection sensor 1 or there is at least no too great a deviation between the features M to be recognized according to expectations and the features M actually recognized by the surroundings detection sensor 1, it is concluded that there is no degradation of the surroundings detection sensor 1. However, when the surroundings detection sensor 1 does not recognize any features M or when the features M actually recognized by the surroundings detection sensor 1 in this comparison are not consistent with the features M to be recognized according to expectations and a great, in particular too great a, deviation is present, it is concluded that there has been degradation of the surroundings detection sensor 1.

A great deviation, in particular too great a deviation, is present, in particular, when the deviation exceeds a predetermined tolerance range. This means when the features M actually recognized by the surroundings detection sensor are not consistent with the features M to be recognized according to expectations, the deviation between the features M actually recognized by the surroundings detection sensor 1 and the features M to be recognized according to expectations is, however, not too great, in particular lies within the predetermined tolerance range, no degradation of the surroundings detection sensor 1 is recognized. The threshold value for a level of tolerance can be derived using safety requirements, for example, according to which a spacing measurement, for example, may not exceed a predetermined error or a classification rate of a surroundings detection sensor 1 may not fall below a predetermined threshold value in a sensor composite.

The method makes it possible to ascertain for the automatically driving vehicle 2, for example a shuttle or robotaxi, whether a surroundings detection sensor system, comprising the at least one surroundings detection sensor 1 or more identical or different surroundings detection sensors 1, has a reduction in terms of efficiency. In the event of a recognized reduction of the efficiency, an extended system reaction of the vehicle 2 can be introduced to avoid dangerous situations.

In order to implement the method for checking the surroundings detection sensor 1, a regular state of the surroundings detection sensor 1, in particular in terms of a calibration, range of vision, blockage, etc., is monitored in the vehicle 2 or in the surroundings detection sensor 1 itself. However, without reference measurements of the surroundings being driven through, this is more difficult and lengthier, since mostly statistical processes have to be carried out. For this reason, the above-mentioned "OEM specific overlay" in the digital map 4 is used for storing reference measurements to be expected and corresponding sensor-specific measurement properties.

In doing so, it is achieved for sensor technology present in the vehicle 2, i.e., for the respective surroundings detection sensor 1 to be checked by means of the method, that it is known at each point in time which infrastructure objects, i.e., stationary objects 5, for example buildings G, road signs V, traffic equipment L, for example signposts, and/or other objects 5 would have to be recognized at which location or position. Should one or more of the expected stationary objects 5, in particular the features M thereof, not be able to be ascertained by means of the respective surroundings detection sensor 1 and should this not be able to be justified by a vision obstruction, in particular by further dynamic objects, a so-called performance degradation, i.e., a degradation of the respective surroundings detection sensor 1, is to be assumed.

Such a degradation can be brought about, for example, by atmospheric influences, for example as by fog and/or rain and/or snow, and/or by mechanical influences. FIG. 2 shows an example of an atmospheric influence, i.e., an atmospheric disruption 8 of the surroundings detection sensor 1.

In terms of this, the method allows indication of the respective cause. Thus, atmospheric influences are systematically characterized in all relevant surroundings detections sensors 1 of the technologies receptive to such atmospheric influences, whereas mechanical influences remain limited to a surroundings detection sensor 1 or a few surroundings detection sensors 1. This means that a mechanical influence can be concluded on, in particular when one or more surroundings detection sensors 1 of the vehicle 2 have a degradation and one or more other surroundings detection sensors 1 of the vehicle 2 formed in the same way as the surroundings detection sensors 1 that have the degradation and/or that would also have to be affected by an atmospherically caused degradation do not have any degradation.

Such a determination as to whether the respectively present degradation is atmospherically or mechanically caused can be advantageous since an atmospherically caused degradation changes when the atmospheric conditions change, such that there is no longer any degradation of the surroundings detection sensor 1 under atmospheric conditions. A mechanical degradation, for example due to damage to the surroundings detection sensor 1 and/or a region of the vehicle 2 in which it is installed, is not improved on its own accord, but rather requires repair or replacement or an alignment and/or calibration of the surroundings detection sensor 1, for example.

However, to do so, it is necessary for the vehicle 2 to know which stationary objects 5 with which features M are present in the surroundings and are to be detected by the at least one surroundings detection sensor 1.

To do so, the features M of stored stationary objects 5 of the surroundings of the vehicle 2, about which objects it is to be expected that they are recognized by the surroundings detection sensor 1, are stored in the digital map 4, in particular together with sensor-specific detection information. The digital map 4 is retrieved by the central storage unit 6 external to the vehicle with the stored features M of the stationary objects 5 for a predetermined projection horizon by the vehicle 2.

Here, the vehicle 2 is formed in such a way that the features M on the digital map 4 can be identified and recognized from this. Due to storing the features M with the sensor-specific detection information, i.e., sensor-specific additional data of the corresponding surroundings detection sensor 1, the stationary objects 5 and the features M thereof are thus encoded sensor-specifically in the digital map 4, such that it can be read directly from the digital map 4 which stationary objects 5 and which related corresponding features M of the respective detection sensor 1 must be recognized in the surroundings of the vehicle 2.

Furthermore, the digital map 4 is continuously updated on the central storage unit 6 external to the vehicle, wherein updating is carried out by means of features M of stationary objects 5 detected by means of a plurality of vehicles 2, 7.1 to 7.*n* and transmitted to the storage unit 6. For example, a vehicle 2 fitted with a safely calibrated surroundings detection sensor 1 without recognized field of vision limitation transmits its features M of stationary objects recognized by its surroundings detection sensor 1 in the surroundings to the storage unit 6.

Here, a reflectivity of the stationary objects 5 at a predetermined distance apart from the surroundings detection sensor 1 when forming the surroundings detection sensor 1 as a Lidar sensor, for example, a back-radiation cross-section of the stationary objects 5 when forming the surroundings detection sensor 1 as a radar sensor, for example, and a texture of the stationary objects 5 when forming the surroundings detection sensor 1 as a camera are stored in the map as features M of the stationary objects 5 depending on the type of surroundings detection sensor 1. For example, when forming the surroundings detection sensor 1 as a Lidar sensor, it is transmitted to the storage unit 6 together with the position POS of the corresponding vehicle 2, 7.1 to 7.*n* that the reflectivity of the signpost 100 m away is "XX lumen", or when forming the surroundings detection sensor 1 as a radar sensor that a back-radiation cross-section of the object 5 is "YY $cm_2$", or when forming the surroundings detection sensor 1 as a camera, the object 5 has a certain texture.

Furthermore, sensor-specific data relating to the object 5, such as a positional specification of the object 5, for example, is transmitted to the storage unit 6, optionally consolidated in this and stored in the "OEM specific overlay" correspondingly to the object 5.

Furthermore, it is ascertained by means of the plurality of the transmitted features M how high a degree of reliability this is. An update of the digital map 4 is only carried out when the transmitted features M deviate from the features M stored in the digital map 4 and a degree of reliability exceeds a predetermined value.

For each of the vehicles 2, 7.1 to 7.*n*, in the present case for the vehicle 2, it is now possible to retrieve the map data D of the digital map 4 together with the features M of the stationary objects 5 for the predetermined projection horizon of the central storage unit 6 external to the vehicle and to carry out the comparison, described above, of the detected features M with the stored features M in order to ascertain a degradation of the surroundings detection sensor 1.

If such a degradation of the respective checked surroundings detection sensor 1 is recognized, the system, i.e., the vehicle 2, in particular a system for carrying out the automated driving operation of the vehicle 2, advantageously reacts with an adequate behavior, wherein a degree of automation of the driving operation is reduced.

Thus, for example in the event of a reduction of a field of vision, i.e., a detection field, of the respective checked surroundings detection sensor 1, a maximum speed of the vehicle 2 is advantageously reduced. Alternatively, or additionally, in the event of such an error, i.e., in the event of a recognized degradation of the respective checked surroundings detection sensor 1, the vehicle 2 can also be actively parked, for example. In this case, the vehicle 2 drives automatically, for example, to a suitable position, for example on the edge of the road, onto a hard shoulder, into an emergency stop bay or a parking space, and is parked there. The respective procedure, i.e., whether, in what form, with what speed and how far the vehicle 2 drives further, in particular automatically, depends, in particular, on an extent of the degradation ascertained of the respective surroundings detection sensor 1 and on how many and which surroundings detection sensors 1 of the vehicle 2 have such a degradation.

Alternatively or additionally to such a reaction of the vehicle 2, in particular an automatic one, to the recognized degradation of the respective checked surroundings detection sensor 1, it can be provided, for example, that a teleoperator, i.e., a person who is not in the vehicle 2 or in the immediate vicinity of the vehicle 2, but has remote access to the vehicle 2, in particular to control and/or regulate devices of the vehicle 2, assesses a current performance of the respective surroundings detection sensor 1 for which a degradation has been established by the checking, and correspondingly initiates further steps, for example reduce the maximum speed of the vehicle 2, change a driving route of the vehicle 2 and/or park the vehicle 2, in particular in a suitable parking position, or initiates this.

It is also possible that, when degradation of at least one surroundings detection sensor 1 is detected, a driving task is transferred to a driver so that they carry on driving the vehicle 2. In the event of the driver erroneously taking over the driving, for example due to their being limited, the vehicle 2 is brought to a standstill within a predetermined period of time. In a possible design, it is provided that, before the vehicle 2 stops, it is initially guided to the edge of the road or a hard shoulder and then brought to a standstill.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for checking at least one surroundings detection sensor of a vehicle, the method comprising:
   receiving, by the vehicle from a central storage unit external to the vehicle, a digital map including an original equipment manufacturer (OEM) specific overlay storing information for a plurality of stationary objects in the digital map so that the plurality of stationary objects and features of the plurality of stationary objects are encoded sensor-specifically in the digital map such that which of the plurality of stationary objects must be recognized is readable directly from the digital map, wherein the information for the plurality of stationary objects includes reference measurements to be expected and corresponding sensor-specific measurement properties for a plurality of different types of surroundings detection sensors, wherein the at least one surroundings detection sensor is a first type of the plurality of types of surroundings detection sensors, and wherein the plurality of stationary objects in the digital map are objects expected to be recognized by the at least one surroundings detection sensor in surroundings of the vehicle;
   localizing the vehicle on the digital map;
   identifying features of one of the plurality of stationary objects in the digital map;
   detecting at least one of the plurality of stationary objects in the surroundings of the vehicle by the at least one surroundings detection sensor performing a measurement of the at least one of the plurality of stationary objects;
   determining, using the measurement by the at least one surroundings detection sensor of the at least one of the plurality of stationary objects, reference measurements to be expected of the at least one of the plurality of stationary objects and corresponding sensor-specific measurement properties for the first type of the plurality of types of surroundings detection sensors, there is a degradation of the at least one surrounding detection sensor responsive to the identified features of the one of the plurality of stored stationary objects not being recognized by the surroundings detection sensor or responsive to features actually detected by the at least one surroundings detection sensor deviating more than a threshold amount from the identified features of the one of the plurality of stationary objects, wherein the method further comprises
   receiving, from the vehicle and a plurality of additional vehicles, measurements made by surroundings detection sensors of the vehicle and the plurality of vehicles of at least one of the plurality of stationary objects; and
   continuously updating the OEM specific overlay of the digital map on the central storage unit external to the vehicle using the received measurements.

2. The method of claim 1, wherein the plurality of different types of surroundings detection sensors include a lidar sensor, a radar sensor, and a camera, wherein the corresponding sensor-specific measurement property for:
   the lidar sensor is a reflectivity of the plurality of stationary objects at a predetermined distance apart from the lidar sensor;
   the radar sensor is a back-radiation cross-section of the plurality of stationary objects; and
   the camera is a texture of the plurality of stationary objects.

3. A method for operating a vehicle, the method comprising:
   operating the vehicle in a highly automated or autonomous driving operation;
   checking at least one surroundings detection sensor of the vehicle by:
      receiving, by the vehicle from a central storage unit external to the vehicle, a digital map including an original equipment manufacturer (OEM) specific overlay storing information for a plurality of stationary objects in the digital map so that the plurality of stationary objects and features of the plurality of stationary objects are encoded sensor-specifically in the digital map such that which of the plurality of stationary objects must be recognized is readable directly from the digital map, wherein the information for the plurality of stationary objects includes reference measurements to be expected and corresponding sensor-specific measurement properties for a plurality of different types of surroundings detection sensors, wherein the at least one surroundings detection sensor is a first type of the plurality of types of surroundings detection sensors, and wherein the plurality of stationary objects in the digital map are objects expected to be recognized by the at least one surroundings detection sensor in surroundings of the vehicle;
      localizing the vehicle on the digital map;
      identifying features of one of the plurality of stationary objects in the digital map;
      detecting, by the at least one surroundings detection sensor, at least one of the plurality of stationary objects in the surroundings of the vehicle by the at least one surroundings detection sensor performing a measurement of the at least one of the plurality of stationary objects; and
      determining, using the measurement by the at least one surroundings detection sensor of the at least one of the plurality of stationary objects, reference measurements to be expected of the at least one of the plurality of stationary objects and corresponding sensor-specific measurement properties for the first type of the plurality of types of surroundings detection sensors, there is a degradation of the at least one surrounding detection sensor responsive to the identified features of the one of the plurality of stationary objects not being recognized by the surroundings detection sensor or responsive to features actually detected by the at least one surroundings detection sensor deviating more than a threshold amount from the identified features of one of the plurality of stationary objects,
   reducing a degree of automation of the highly automated or autonomous driving operation or transferring a driving task to a driver of the vehicle responsive to the determination that there is the degradation of the at least one surroundings detection sensor.

4. The method of claim 3, wherein the vehicle is brought to a standstill responsive to an erroneous takeover of the driving task by the driver within a predetermined period of time.

5. The method of claim 4, wherein, responsive to the erroneous takeover of the driving task by the driver, the vehicle is initially guided to an edge of a road or a hard shoulder within the predetermined period of time and then brought to the standstill.

6. The method of claim 3, wherein the plurality of different types of surroundings detection sensors include a lidar sensor, a radar sensor, and a camera, wherein the corresponding sensor-specific measurement property for:
   the lidar sensor is a reflectivity of the plurality of stationary objects at a predetermined distance apart from the lidar sensor;
   the radar sensor is a back-radiation cross-section of the plurality of stationary objects; and
   the camera is a texture of the plurality of stationary objects.

7. The method of claim 3, further comprising:
   receiving, from the vehicle and a plurality of additional vehicles, measurements made by surroundings detection sensors of the vehicle and the plurality of vehicles of at least one of the plurality of stationary objects; and
   continuously updating the OEM specific overlay of the digital map on the central storage unit external to the vehicle using the received measurements.

* * * * *